United States Patent [19]

Nowacki et al.

[11] Patent Number: 4,884,460

[45] Date of Patent: Dec. 5, 1989

[54] DEVICE FOR SENSING AIR FLOW

[75] Inventors: Christopher Nowacki, Long Grove; Alfred G. Brisson, Kildeer, both of Ill.

[73] Assignee: Northgate Research, Inc., Arlington Heights, Ill.

[21] Appl. No.: 278,372

[22] Filed: Dec. 1, 1988

[51] Int. Cl.[4] ............................................. G01F 1/40
[52] U.S. Cl. ................... 73/861.52; 73/861.61; 128/725
[58] Field of Search ........... 73/861.52, 861.61, 861.62, 73/861.63, 861.64; 128/725

[56] References Cited

U.S. PATENT DOCUMENTS

| | | | |
|---|---|---|---|
| 2,760,371 | 8/1956 | Borden | 73/861.63 |
| 4,040,293 | 8/1977 | Wilson | 73/861.61 |
| 4,047,521 | 9/1977 | Kramer et al. | 128/725 |

*Primary Examiner*—Herbert Goldstein
*Attorney, Agent, or Firm*—Robert M. Wolters

[57] ABSTRACT

A venturi device is provided for sensing air flow. The device includes a body having first and second substantially cylindrical end portions interconnected by a wasp-waisted intermediate portion. The end portions are provided with bores which may be of different internal diameter. The intermediate portion is provided with axially aligned counterbores. These counterbores are connected by four bores of relatively small diameter. A radially inwardly extending wall in the through-bore comprises a flow restriction, and lateral bores are provided on opposite sides of the wall extending radially outwardly from the through-bore.

10 Claims, 1 Drawing Sheet

U.S. Patent  Dec. 5, 1989  4,884,460
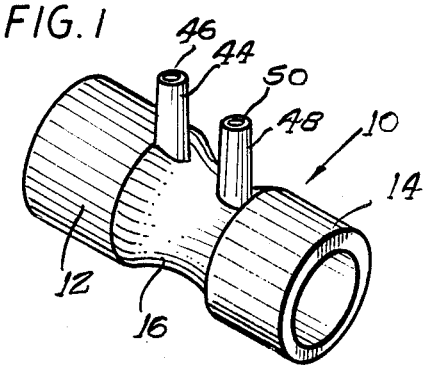
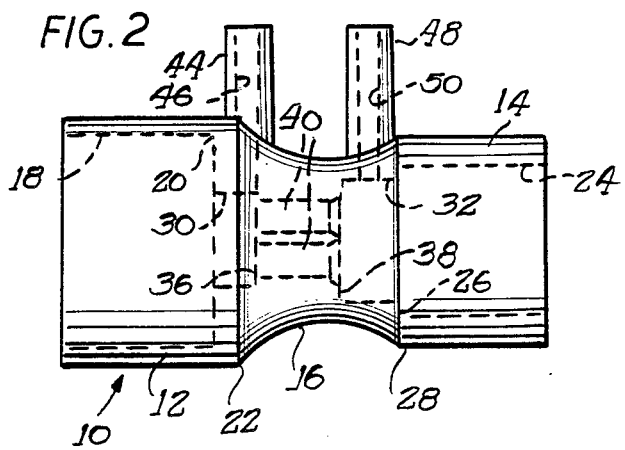
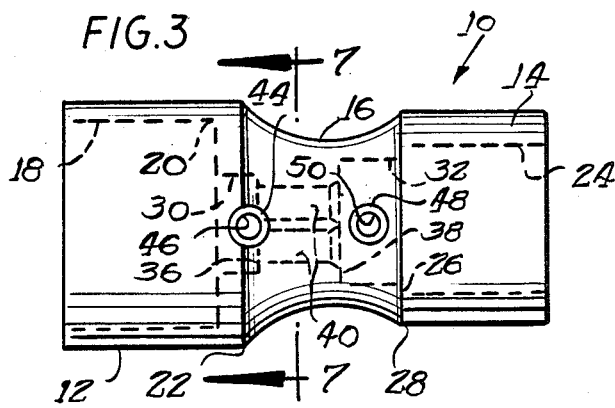
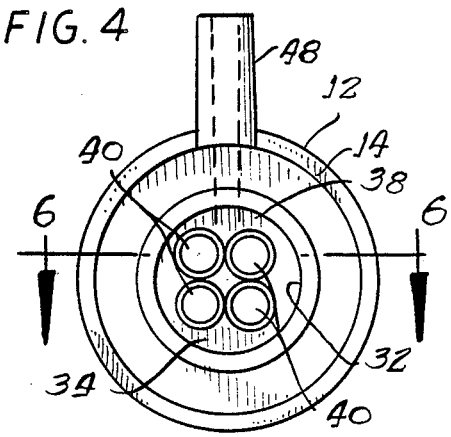
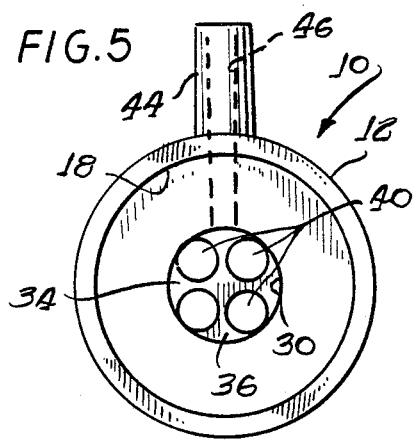
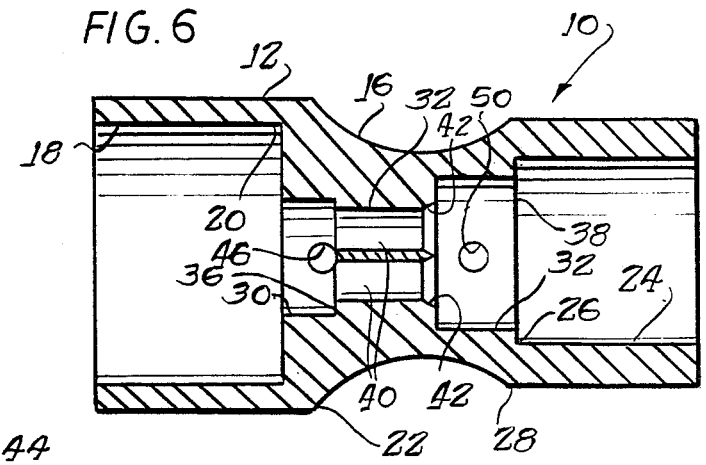
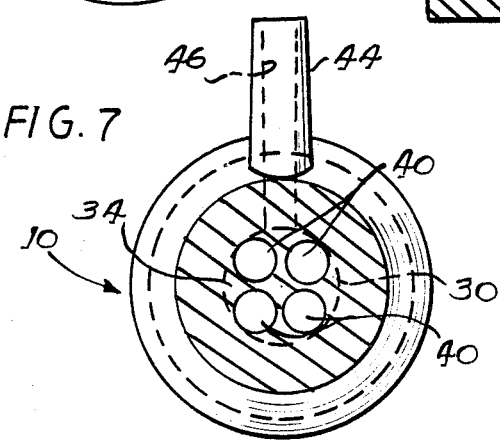
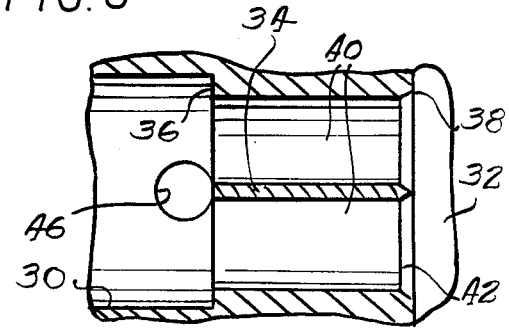

DEVICE FOR SENSING AIR FLOW

CROSS REFERENCE TO RELATED APPLICATON

The present application is related to U.S. Patent Des. 296,530 by Christopher Nowacki and Alfred G. Brisson for "Design for Flow Sensor".

BACKGROUND OF THE INVENTION

Oxygen or a mixture of air and oxygen is often supplied to a patient in a hospital or nursing home. The oxygen can be supplied on a demand basis, or it can be used for force or induced ventilation if the patient experiences difficulty in voluntary breathing. In any event, it is usually desired to monitor the volume and rate of flow of oxygen or other gas to the patient. Furthermore, it often is desired to measure the patient's capability of exhaling.

OBJECTS AND SUMMARY OF THE PRESENT INVENTION

It is an object of the present invention to provide a venturi device for sensing air flow in a rate volume monitor or for measuring the rate and volume on exhalation.

More particularly, it is an object of the present invention to provide such a venturi device which is usable with hoses of the same diameter or of different diameters.

In accordance with the present invention, a venturi device is provided which has ends of different diameters. A larger diameter end has a slightly tapered inside diameter for receipt of an oxygen or the like hose, while the opposite end is of smaller diameter, and is tapered inside and out for alternative external receipt of a hose of the same diameter as the first one, or for interior receipt of a hose of smaller diameter. To avoid false or ambiguous readings, the axially central portion of the device is provided with a smaller diameter section of uniform diameter of significant length and having midway thereof a barrier of particular shape to produce a pressure drop. Lateral connections for air tubing are provided axially oppositely of said barrier. Four small bores extend axially through the barrier, and have been found to produce superior results as compared with a conventional single large bore.

THE DRAWINGS

The present invention will best be understood with reference to the following specification when taken in connection with the accompanying drawings wherein:

FIG. 1 is a perspective view of a venturi device constructed in accordance with the present invention;

FIG. 2 is a side view thereof on an enlarged scale;

FIG. 3 is a top view thereof;

FIG. 4 is an end view thereof as taken from the right end of FIG. 2;

FIG. 5 is an end view taken from the left end of FIG. 2;

FIG. 6 is a longitudinal sectional view thereof as taken along the line 6—6 in FIG. 4;

FIG. 7 is a transverse sectional view as taken substantially along the line 7—7 in FIG. 3; and FIG. 8 is an enlarged longitudinal sectional view similar to FIG. 6 of the midportion of the device.

DETAILED DISCLOSURE OF THE ILLUSTRATED EMBODIMENT

Turning now in greater particularity to the figures of the drawing, there will be seen a venturi device 10 for sensing air flow constructed in accordance with the principles of the present invention. The venturi device comprises a one-piece molding of plastic resin material, preferably polycarbonate. The device may be of different sizes, but dimensions will be given for a typical example. The device is provided with a cylindrical left or entering end portion 12 having an external diameter of 1.000 inch. The device further is provided with a right or exit end substantially cylindrical portion 14. At the right extremity of the portion 14, the outside diameter is 0.860 inch, and there is a one degree taper so that the left margin of the right end portion 14 is of slightly greater diameter than the right extremity thereof. The end portions 12 and 14 are connected by a central portion 16 that is longitudinally arcuate and provides a wasp-waisted appearance. The curve of the center portion 16 is on a radius of 0.477 inch, and the center of this radius is closer to the right end portion 14 than to the left end portion 12.

The left end cylindrical portion 12 is provided with a bore 18 having an entering diameter of 0.885 inch and tapering inwardly at one degree to a right angle shoulder 20 which is short of the outer extremity 22 of the left end portion where the outer cylindrical portion 12 forms a juncture with the central curved portion 16. The right end portion 14 is provided with a central bore 24 having an entering diameter of 0.608 inch and tapering inwardly at one degree to an internal shoulder 26. This internal shoulder is coincident with the left extremity 28 of the right end portion 14. The distance from the left extremity of the cylindrical portion to the internal shoulder 20 and also the internal dimension from the right end of the portion 14 to the internal shoulder 26 is 0.625 inch. The total overall length of the device from end to end is 2.000 inches.

The bores 18 and 24 are coaxial, and coaxial counterbores 30 and 32 extend respectively from these two bores and toward one another. The right counterbore 32 is of 0.500 inch diameter while the left counterbore 30 is of 0.375 inch diameter, each tapering inwardly from its outer end very slightly to permit separation from mold parts. The total length from the shoulder 20 to the shoulder 26 is 0.625 inch.

Between the counterbores 30 and 32 there is provided a flow restriction comprising a barrier or wall 34 defined by flat faces 36 and 38 at the depths of the respective counterbores 30 and 32. The faces 36 and 38 are connected by four axially extending cylindrical bores 40 of 0.148 inch diameter, the right ends of which may be champferred at 42.

Each bore 18, 24 is 0.625 inch long. The right counterbore 32 is 0.250 inch long, and the left counterbore 30 is 0.175 long. The wall 34 is 0.325 inch thick.

A first lateral tube 44 extends from the device 10 and has a bore 46 in fluid communication with the counterbore 30. The center line of the bore 46 is 0.750 inch from the left end of the device. The tube 44 is integral with the remainder of the device and connects thereto mostly in the center curved section 16, but partially overlying the left cylindrical portion 12. The tube extends 0.375 inch out from the circumference of the left cylindrical portion 12.

A second lateral tube 48 lies in a common axial plane with the tube 44 and has a bore 50 extending from the outer end into fluid communication with the counterbore 32. The center line of the bore 50 is spaced 0.750 inch from the right end of the device and 0.500 inch from the center line of the bore 46, and the two bores 46 and 50 are disposed nonsymmetrically with respect to the flow-restricting wall or barrier 34. The tube 48 joins the remainder of the device entirely within the curved center portion 16.

Both tubes 44 and 48 extend at right angles to the axis of the device. Each tube has at its upper end an outer diameter of 0.187 inch and tapers outwardly as it approaches the main body of the device. Each bore 46, 50 at the outer end of the respective tube has a bore diameter of 0.094 inch with a very slight inward taper from the outer end of the inner end of the bore to facilitate removal from molding tools.

In use, the device 10 is inserted between two lengths of resilient tubing, such as rubber tubing. The tubing may be of the same diameter, or different diameters. The supply tubing has an outside diameter slightly greater than the 0.870 inch diameter of the left portion bore 18, and can be pushed into this bore, wedging in place due to the taper of the bore. If the tubing going to the patient is of the same diameter, then it is installed over the outside of the right end portion 14, being somewhat stretched, particularly in view of the taper of the outside diameter of the right end portion 14. It is common for the tubing feeding to the patient to be of smaller diameter, and in this instance the outside diameter is such that the tubing can be wedged into the right portion bore 24.

Turbulent flow is to be expected in passing from a larger diameter bore to a smaller diameter bore, and this would provide useless pressure drop readings across a barrier. However, such turbulent flow is in part avoided by the provision of the counterbores 30 and 32. A pressure drop will occur across the barrier or wall 34 in accordance with the well-known Bernoulli principle, whereby the pressure in the lateral tubing bore 50 will be less than that in the bore 46. Small diameter rubber or the like tubes are stretched over the tubes 44 and 48 and lead to an air pressure-to-electric voltage transducer which is connected to further electronic equipment, for example, as in our prior U.S. Pat. No. 4,602,171, for calculating rate and volume of flow.

It is to be appreciated that the wasp-waisted center portion 16 provides an efficient finger grip for holding the venturi device 10 between forefinger and thumb for assembling the various tubings therewith. The tubes 44 and 48 supplement the wasp waist as a finger grip.

The plurality of small bores 40 comprises an important aspect of the present invention. As compared with a single large hole or bore of substantially equal area, there is 30% less restriction to flow. Therefore, a stronger signal is obtained. Air volume of approximately 5 to 120 liters/minute can now be measured, as contrasted with a range of 20–120 liters/minute with a single hole. This is due to better control of air flow without molecules of air collecting in the flow path. There is also less tumbling of the air.

An air supply tube for air and oxygen is connected to the large end 12 of the venturi device, and the small end 14 is connected to an endotracheal tube. The four bores 40 are symmetrical about the axis of the device 10 and the bores are as large as possible within the one-half inch diameter of the counterbore 30. The bores are slightly closer to the left (large) end than to the small end and they are closer to the tube 44 than to the tube 50 to maximize signal. The near equality in diameter of the counterbores 30 and 32 is important in producing proper air flow.

Readings are taken on patient exhalation. A positive pressure at that time is found at the proximate end (the right or small end 14) and a strong negative pressure is found at the distal end. The negative pressure is due at least in part to cavitation bubbles as the exhaled air moves from the bores 40 into the counterbore 30 and the bore 18.

The specific example of the invention as herein shown and described is for illustrative purposes only. Various changes instructure will no doubt occur to those skilled in the art and will be understood as forming a part of the present invention insofar as they fall within the spirit and scope of the appended claims.

The invention is claimed as follows:

1. A venturi device for sensing air flow comprising a body including first and second substantially cylindrical end portions and an intermediate center portion, said first and second end portions respectively having first and second outer diameters, said first and second end portions respectively having coaxial bores of respective first and second internal diameters, first and second counterbores in said intermediate center portion coaxial with and respectively having opposite open ends interconnecting with said first and second bores and respectively having first and second diameters smaller than either of said first and second internal diameters, means providing a flow restriction interconnecting said counterbores and comprising a plurality of parallel coextensive axially directed bores of small diameter relative to said counterbores, and a pair of lateral bores through said intermediate portion and respectively in fluid communication with said counterbores on opposite sides of said small diameter bores.

2. A venturi device as set forth in claim 1 wherein said plurality of small diameter bores comprises four bores.

3. A venturi device as set forth in claim 1 wherein said plurality of small diameter bores is circumscribed by an axial projection one of said first and second counterbores.

4. A venturi device as set forth in claim 3 wherein one of said counterbores is of smaller diameter than the other and an axial projection circumscribes said plurality of small diameter bores.

5. A device as set forth in claim 1 wherein said intermediate portion has an outer surface shaped as a finger grip.

6. A device as set forth in claim 5 wherein said intermediate portion hacked-in.

7. A device as set forth in claim 6 wherein said intermediate portion has an outer surface which is a portion of a surface of a toroid.

8. A device as set forth in claim 6 and further including a pair of radial tubes extending from said intermediate portion and through which said lateral bores extend.

9. A device as set forth in claim 1 wherein said lateral bores are unsymmetrically disposed about said flow restriction.

10. A device as set forth in claim 2 wherein said lateral bores are unsymmetrically disposed about said flow restriction.

* * * * *